(No Model.)

T. L. WILSON.
RAILWAY CAR.

No. 311,553. Patented Feb. 3, 1885.

Witnesses.
W. J. Graham.
E. C. Baldwin.

Inventor:
Thomas L. Wilson.
by Donald C. Ridout & Co.
Attys.

United States Patent Office.

THOMAS L. WILSON, OF PORT HOPE, ONTARIO, CANADA.

RAILWAY-CAR.

SPECIFICATION forming part of Letters Patent No. 311,553, dated February 3, 1885.

Application filed September 22, 1884. (No model.) Patented in Canada December 15, 1884, No. 20,742.

*To all whom it may concern:*

Be it known that I, THOMAS LAVERICK WILSON, of the town of Port Hope, in the county of Durham, in the Province of Ontario, Canada, have invented certain new and useful Improvements in Railway-Cars, of which the following is a specification.

The object of the invention is to devise a simple, cheap, and effective contrivance for preventing the truck of a car slewing more than is necessary for curving, which contrivance performs the additional service of a hold-fast to prevent the car leaving the truck in the event of derailment; and it consists, essentially, in providing a saddle made of malleable cast-iron or of cast-steel and formed to fit upon and be secured to the body-bolster of the car, the said saddle projecting on either side of the bolster and arranged to extend below internally-projecting flanges formed on the saddle or saddles, bolted to the top of the truck side timber or to the transom-timber of the truck, substantially as hereinafter more particularly explained.

On the 15th May, 1883, I obtained Letters Patent of the United States No. 277,819, in which I describe a device designed to accomplish in a measure the object of my present invention. On the 12th February, 1884, I also obtained a patent, No. 293,608, having the same object in view, and in the specification attached to this latter patent I recited the fact that I am aware of American Patents Nos. 104,580, 173,257, 182,455, and 227,792, which latter patents describe devices applied to cars to prevent the trucks oscillating.

Figure 1:
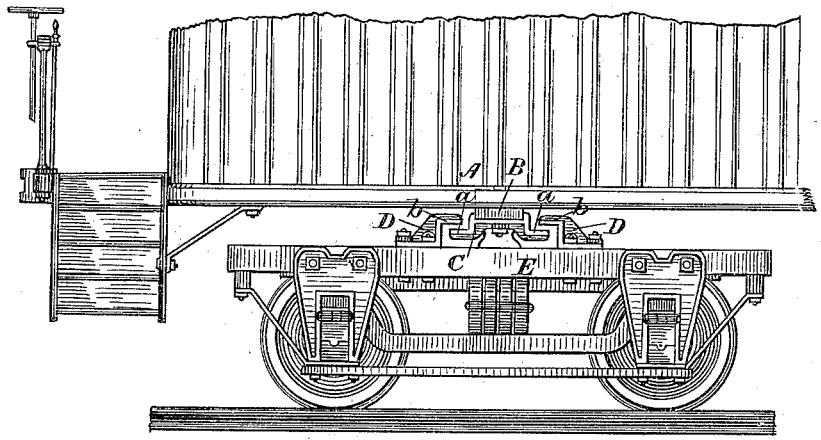
Figure 3:
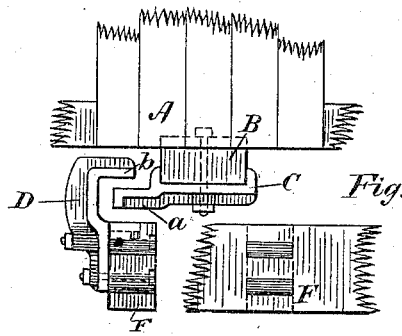
Figure 5:
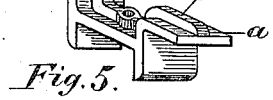
Figure 4:
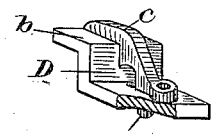
Figure 6:
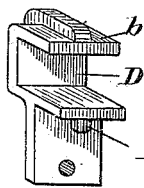
Figure 2:
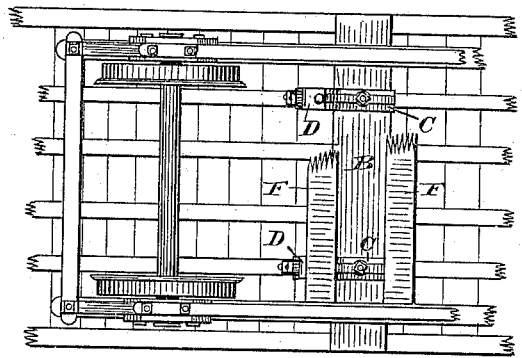

Figure 1 is a side view showing a portion of the end of a passenger-car resting on a truck provided with my improved locking device. Fig. 2 is a bottom view showing a portion of the transom of a freight-car truck and the bottom of the car having my improved locking device. Fig. 3 is an enlarged detail showing my locking-saddle attached to the bolster of a freight-car and the butting saddle bolted to the transom-timber of the truck. Fig. 4 is a detail showing a form of butting saddle when made to fit onto a passenger-truck as shown in Fig. 1. Fig. 5 is a detail of locking-saddle. Fig. 6 is a detail of a butting saddle as made when applied as shown in Fig. 3.

In the drawings like letters of reference indicate corresponding parts in each figure.

A is a car-sill; B, the body-bolster; C, the locking-saddle; D, the butting saddle, and E the truck side. When applied as shown in Fig. 1, the locking-saddle C is bolted to the bottom of the body-bolster B. Its arms $a$ project below the flanges $b$, formed on the butting saddle D, which are rigidly fastened to the truck side E, or, in the case of being applied to a freight-car, are secured to the transom-timber F of the truck. (See Fig. 2.) In both cases the saddles C and D may be set opposite to each other in their respective positions on either side of the car. When placed on a passenger-car, as shown in Fig. 1, the trucks in such cars being very long, it is necessary for the satisfactory working of my device to have two pairs of saddles, D, bolted to the truck, and arm $a$ extending from both sides of the saddle C, so as to project below the flanges $b$, formed on their respective saddles D. When the car slews, the butting saddles D strike against the end of the locking-saddles C, thereby preventing the truck from slewing more than is necessary for the satisfactory curving of a car. Consequently, in the event of a car being derailed the truck will be kept in line with the rail, and consequently the car will not be thrown far off the track. The projecting flanges $b$, formed on the butting saddles D, prevent the truck from becoming disconnected from the car. It will be noticed that the saddles D are strengthened by a central rib, $d$, placed on each, and that the saddle C is also strengthened by a rib, $c$, formed on its bottom.

I might mention here that a serious objection to the device described in my Patent No. 293,608 is that, in order to permit the bracket therein described to project over the body-bolster of the car, it was necessary to cut away the deafening-boards usually placed in the bottom of passenger-cars. This left an opening into the space left between the deafening-boards and the car, and formed openings through which sparks found their way. By the adoption of my present form of locking device this objection is entirely obviated. Moreover, my present device is very much cheaper to construct, as the parts may be formed in the foundry and placed in position without any skilled labor being required.

What I claim as my invention is—

The saddle C, bolted to the body-bolster B, and having an arm or arms, a, projecting from its sides, in combination with the saddles D, bolted to the truck-frame, and having flanges b arranged to project over the arms a, substantially as and for the purpose specified.

Toronto, September 15, 1884.

THOS. L. WILSON.

In presence of—
 DONALD C. RIDOUT,
 CHARLES C. BALDWIN.